(12) United States Patent
Hong et al.

(10) Patent No.: US 7,875,654 B2
(45) Date of Patent: Jan. 25, 2011

(54) SYSTEM FOR FORMING JANUS PARTICLES

(75) Inventors: Liang Hong, Midland, MI (US); Shan Jiang, Champaign, IL (US); Steve Granick, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 936 days.

(21) Appl. No.: 11/690,671

(22) Filed: Mar. 23, 2007

(65) Prior Publication Data

US 2008/0234394 A1    Sep. 25, 2008

(51) Int. Cl.
*B01F 3/22* (2006.01)
*B32B 5/00* (2006.01)

(52) U.S. Cl. .......................................... 516/22; 428/403

(58) Field of Classification Search .................... 516/22
See application file for complete search history.

(56) References Cited

U.S. PATENT DOCUMENTS

| 6,890,963 | B2 | 5/2005 | Clear et al. | |
| 2003/0228415 | A1* | 12/2003 | Bi et al. ........................ | 427/180 |
| 2006/0134420 | A1* | 6/2006 | Poncet-Legrand et al. .. | 428/403 |

OTHER PUBLICATIONS

Anthony et al., "Single-Particle Colloid Tracking in Four Dimensions," Langmuir, 22, pp. 9812-9815, 2006.
Aveyard et al., "Emulsions stabilised solely by colloidal particles," Advances in Colloid and Interface Science, 100-102, pp. 503-546, 2003.
Behrend et al., "Metal-Capped Brownian and Magnetically Modulated Optical Nanoprobes (MOONs): Micromechanics in Chemical and Biological Microenvironments," J. Phys. Chem. B, 108, pp. 10408-10414, 2004.
Behrend et al., "Microrheology with modulated optical nanoprobes (MOONs)," Journal of Magnetism and Magnetic Materials, 293, pp. 663-670, 2005.
Cayre et al., "Fabrication of asymmetrically coated colloid particles by microcontact printing techniques," J. Mater. Chem., 13, pp. 2445-2450, 2003.
Dendukuri et al., "Continuous-flow lithography for high-throughput microparticle synthesis," Nature Materials, vol. 5, pp. 365-369, 2006.
Dinsmore et al., "Colloidosomes: Selectively Permeable Capsules Composed of Colloidal Particles," Science, vol. 298, pp. 1006-1009, 2002.
Erhardt et al., "Janus Micelles," Macromolecules, 34, pp. 1069-1075, 2001.
Fujimoto et al., "Preparation of Unsymmetrical Microspheres at the Interfaces," Langmuir, 15, pp. 4630-4635, 1999.
de Gennes, "Soft Matter," Reviews of Modern Physics, vol. 64, No. 3, pp. 645-648, 1992.
Gu et al., "Heterodimers of Nanoparticles: Formation at a Liquid-Liquid Interface and Particle-Specific Surface Modification by Functional Molecules," J. Am. Chem. Soc., 127, pp. 34-35, 2005.
Hong et al., "Simple Method to Produce Janus Colloidal Particles in Large Quantity," Langmuir, 22, pp. 9495-9499, 2006.
Hong et al., "Rotation in Suspension of a Rod-Shaped Colloid," Langmuir, 22, pp. 7128-7131, 2006.
Hong et al., "Clusters of Charged Janus Spheres," Nano Letters, vol. 6, No. 11, pp. 2510-2514, 2006.
Lu et al., "Asymmetric Dimers Can Be Formed by Dewetting Half-Shells of Gold Deposited on the Surfaces of Spherical Oxide Colloids," J. Am Chem. Soc., 125, pp. 12724-12725, 2003.
Nie et al., "Janus and Ternary Particles Generated by Microfluidic Synthesis: Design, Synthesis, and Self-Assembly," J. Am Chem. Soc., 128, pp. 9408-9412, 2006.
Nisisako et al., "Synthesis of Monodisperse Bicolored Janus Particles with Electrical Anisotropy Using a Microfluidic Co-Flow System," Advanced Materials, 18, pp. 1152-1156, 2006.
Noble et al., "Fabrication of "Hairy" Colloidosomes with Shells of Polymeric Microrods," J. Am. Chem. Soc., 126, pp. 8092-8093, 2004.
Paunov et al., "Supraparticles and "Janus" Particles Fabricated by Replication of Particle Monolayers at Liquid Surfaces Using a Gel Trapping Technique," Advanced Materials, 16, No. 9-10, pp. 788-791, 2004.
Perro et al., "Design and synthesis of Janus micro-and nanoparticles," J. Mater. Chem., 15, pp. 3745-3760, 2005.
Qi et al., "A three-dimensional optical potonic crystal with designed point defects," Nature, vol. 429, pp. 538-542, 2004.

(Continued)

*Primary Examiner*—Ling-Siu Choi
*Assistant Examiner*—Chun-Cheng Wang
(74) *Attorney, Agent, or Firm*—Ed Guntin; Guntin Meles & Gust

(57) ABSTRACT

The invention is a method of forming Janus particles, that includes forming an emulsion that contains initial particles, a first liquid, and a second liquid; solidifying the first liquid to form a solid that contains at least a portion of the initial particles on a surface of the solid; and treating the exposed particle sides with a first surface modifying agent, to form the Janus particles. Each of the initial particles on the surface has an exposed particle side and a blocked particle side.

14 Claims, 11 Drawing Sheets

OTHER PUBLICATIONS

Roh et al., "Biphasic Janus particles with nanoscale anisotropy," Nature Materials, vol. 4, pp. 759-763, 2005.

Takahara et al., "Asymmetrically Modified Silica Particles: A Simple Particulate Surfacant for Stabilization of Oil Droplets in Water," J. Am Chem. Soc., 127, pp. 6271-6275, 2005.

Takei et al., "Gradient Sensitive Microscopic Probes Prepared by Gold Evaporation and Chemisorption on Latex Spheres," Langmuir, vol. 13, No. 7, pp. 1865-1868, 1997.

Science Daily, "Polarized Particles Join Toolbox for Building Unique Structures," located at http://www.sciencedaily.com/releases/2006/10/061012184258.htm, 1 page, 2006.

Science Daily, "Janus Particles Offer New Physics, New Technology," located at http://www.sciencedaily.com/releases/2006/03/060319183537.htm, 1 page, 2006.

Verhaegh et al., "Dispersions of Rhodamine-Labeled Silica Spheres: Synthesis, Characterization, and Fluorescence Confocal Scanning Laser Microscopy," Langmuir, 10, 1427-1438, 1994.

Hirose et al., "Adsorption of Janus particles to curved interfaces," The Journal of Chemical Physics, 127, pp. 054707-1 to 054707-5, 2007.

Hong et al., "Simple Method to Produce Janus Colloidal Particles in Large Quantity", Langmuir vol. 22, No. 23, Oct. 17, 2006, pp. 9495-9499. XP002489699 p. 9496 Fig. 1.

Perro et al., "Design and Synthesis of Janus Micro and Nanoparticles", J. Mater. Chem., vol. 25, Jun. 25, 2006; pp. 3745-3760. XP002489700 p. 3753-3754.

Perro et al., "Towards Large Amounts of Janus Nanoparticles Through a Protection-Deprotections Route", Chem. Commun., Oct. 3, 2005; pp. 5542-5543. XP002489701 p. 5542-5543.

He et al., "Novel Janus Cu2(OH)2CO3/CuS Microspheres Prepared Via a Pickering Emulsion Route", Journal of Colloid and Interface Science, Academic Press, New York, NY, US, vol. 306, No. 2, Dec. 23, 2006; pp. 296-299. XP005733262. ISSN:0021-9797 p. 297.

Jiang et al., "Janus Particles on Colloidosome (Pickering Emulsions) and the Role of Added Surfactant", Abstract V29.00013; 2007 APS March Meeting, Denvor, CO., Mar. 8, 2007. XP002789702 the whole document.

* cited by examiner

Time (s)  0    2.0    4.0    6.0    8.0    10.0

SYSTEM FOR FORMING JANUS PARTICLES

FEDERALLY SPONSORED RESEARCH OR DEVELOPMENT

This subject matter of this application may have been funded in part under the following federal research grants and contracts: National Science Foundation grants DMR-0605947 and CMS-0555820, and U.S. Department of Energy grant DEFG02-96-ER45439. The U.S. Government may have rights in this invention.

BACKGROUND

Colloidal particles are fundamental in nature and technology. These particles are larger than molecules but small enough to sustain Brownian motion. A traditional goal in colloid and nanoparticle science is to obtain particles that are homogeneous in their chemical composition, and this attribute continues to have value in applications such as paints, ceramics, and photonic materials (Qi et al., 2004). Of emerging interest, however, is a heterogeneous material known as a Janus particle, in which the surface chemical composition differs on two faces of the particle (de Gennes, 1992)).

Janus particles have numerous applications. For example, an anisotropic surface chemical composition, superposed on a homogeneous shape, introduces asymmetric interactions that may induce particles to self-assemble (Hong et al., 2008). Spherical Janus particles can be used as microrheological probes (Behrend et al., 2004). With magnetic fields being used to exert force on one side of the particle, spherical Janus particles can be used to manipulate particles with controlled magnetic fields (Behrend et al., 2005). Janus particles can also be used as potential building blocks for new three-dimensional self-assembled structures.

The traditional methods for production of Janus particles having a colloidal size of 1 micron ($\mu$m) or less in diameter are severely limited, owing to the limited amount of product obtained. For example, the yields are typically less than 0.5% (Perro et al., 2006). Microfluidic methods can be used to produce larger quantities of particles, but the particle size at present is limited to about 10 to 100 $\mu$m diameter (Nie et al., 2006; Nisisako et al., 2006; Dendukuri, 2006). One current approach to produce Janus particles combines two different materials (Erhardt et al., 2001; Roh et al., 2005); however, the shape and monodispersity characteristics of the resulting particles are difficult to control.

In another approach, homogeneous precursor particles may be modified selectively by a protect-and-release process. This process uses a planar solid substrate as a protecting surface onto which particles are initially placed as a two-dimensional monolayer. The side of the particle that faces the solid substrate is protected, while the other side of the particle is unprotected and can undergo chemical modification. Sputtering (Takei et al., 1997; Lu et al., 2003), stamp coating (Cayre et al., 2003; Paunov et al., 2004), and Langmuir-Blodgett-based methods (Fujimoto et al. 1999) have been used to chemically modify the unprotected side of the particle. This approach offers good control over the surface area that sustains chemical modification; however, only a few milligrams of particles are produced in one batch because the approach relies on modification of a two-dimensional monolayer.

The experimental challenges of producing large quantities of Janus particles of colloidal size have limited their use in technological applications and scientific studies. Attempts to solve the synthetic problem have focused on solution-based methodologies. For example, discrete particles can be joined from two phases at a liquid-liquid interface to form heterodimers (Gu et al., 2005). In another example, the addition of a small amount of water to a particle-in-oil dispersion can cause the particles to aggregate by capillary forces to form clusters, the exterior of which is accessible for chemical modification (Takahara et al., 2005). The problem with this approach is that adequate control of surface coverage of the resultant clusters is difficult to achieve, because the chemical process is subject to kinetic control.

SUMMARY

In first aspect, the invention is a method of forming Janus particles that includes forming an emulsion that contains initial particles, a first liquid, and a second liquid; solidifying the first liquid to form a solid that contains at least a portion of the initial particles on a surface of the solid; and treating the exposed particle sides with a first surface modifying agent, to form the Janus particles. Each of the initial particles on the surface has an exposed particle side and a blocked particle side.

In a second aspect, the invention is a method of forming Janus particles that includes forming an emulsion that contains initial particles, a first liquid, a second liquid, and a surfactant; solidifying the first liquid to form a solid that contains at least a portion of the initial particles on a surface of the solid; and treating the exposed particle sides with a first surface modifying agent, to form the Janus particles. Each of the initial particles on the surface has an exposed particle side and a blocked particle side.

In a third aspect, the invention includes a particle. The particle is a Janus particle having a Janus balance of 10 percent to less than 50 percent.

DEFINITIONS

The term "emulsion" refers to a combination of at least two liquids, where one of the liquids is present in the form of droplets in the other liquid. IUPAC, *Compendium of Chemical Terminology: IUPAC Recommendations*, $2^{nd}$ ed., compiled by A. D. McNaught and A. Wilkinson, Blackwell, Oxford (1997).

The term "colloidosome" refers to a colloidal-sized droplet of a first liquid in a second liquid having particles at the interface formed between the first liquid and a second liquid. A solidified colloidosome, in which the first liquid has solidified, is a colloidal-sized particle having particles on its surface.

The term "surface modifying agent" means any chemical reagent that can change the chemical functionality of a surface.

The term "Janus angle" refers to the three-phase contact angle formed between a particle and the liquid-liquid interface formed between a first liquid and a second liquid.

The term "Janus balance" refers to the percentage of the total contiguous surface area of a particle that contacts a first liquid in a liquid-liquid interface composed of a first liquid and a second liquid. For example, a Janus balance of 25% refers to a particle having 25% of the surface area of the particle in contact with a first liquid and the remaining 75% of the surface area of the particle exposed.

DETAILED DESCRIPTION

The present invention makes use of the discovery of an emulsion method to synthesize Janus particles in large quantity. Colloidosomes form in an emulsion containing particles, a first liquid, a second liquid, and optionally, a surfactant. The particles localize at the liquid-liquid interface of the colloidosome, and solidification of the first liquid forms a solidified colloidosome. The inclusion of a surfactant may permit control over the percentage of the surface area of the particles within the first liquid, thereby enabling control of the Janus balance of the final Janus particles obtained. The exposed surfaces of the immobilized particles are modified chemically by treating the solidified colloidosome with a surface modifying agent. The solid is removed from the solidified colloidosome to release the Janus particles. The previously blocked surfaces of the Janus particles are now accessible for optional subsequent chemical modification. Gram-sized quantities of Janus particles can be synthesized.

This method can achieve superior results over traditional methods of producing Janus particles. First, a dramatic increase in Janus particle yield may be realized with the disclosed process (for example, by 2 orders of magnitude), as compared to Janus particles prepared from two-dimensional monolayer surfaces. Second, the mechanically rigid solidified colloidosomes may be stable in moderately aggressive chemical environments, thereby permitting a greater range of surface modification chemistries. Third, the surface coverage of the modified chemical composition of the particle surface is subject to thermodynamic control, thereby allowing improved monodispersity characteristics among particle batches. Finally, the Janus balance of the obtained particles may be controlled.

Figure 1:
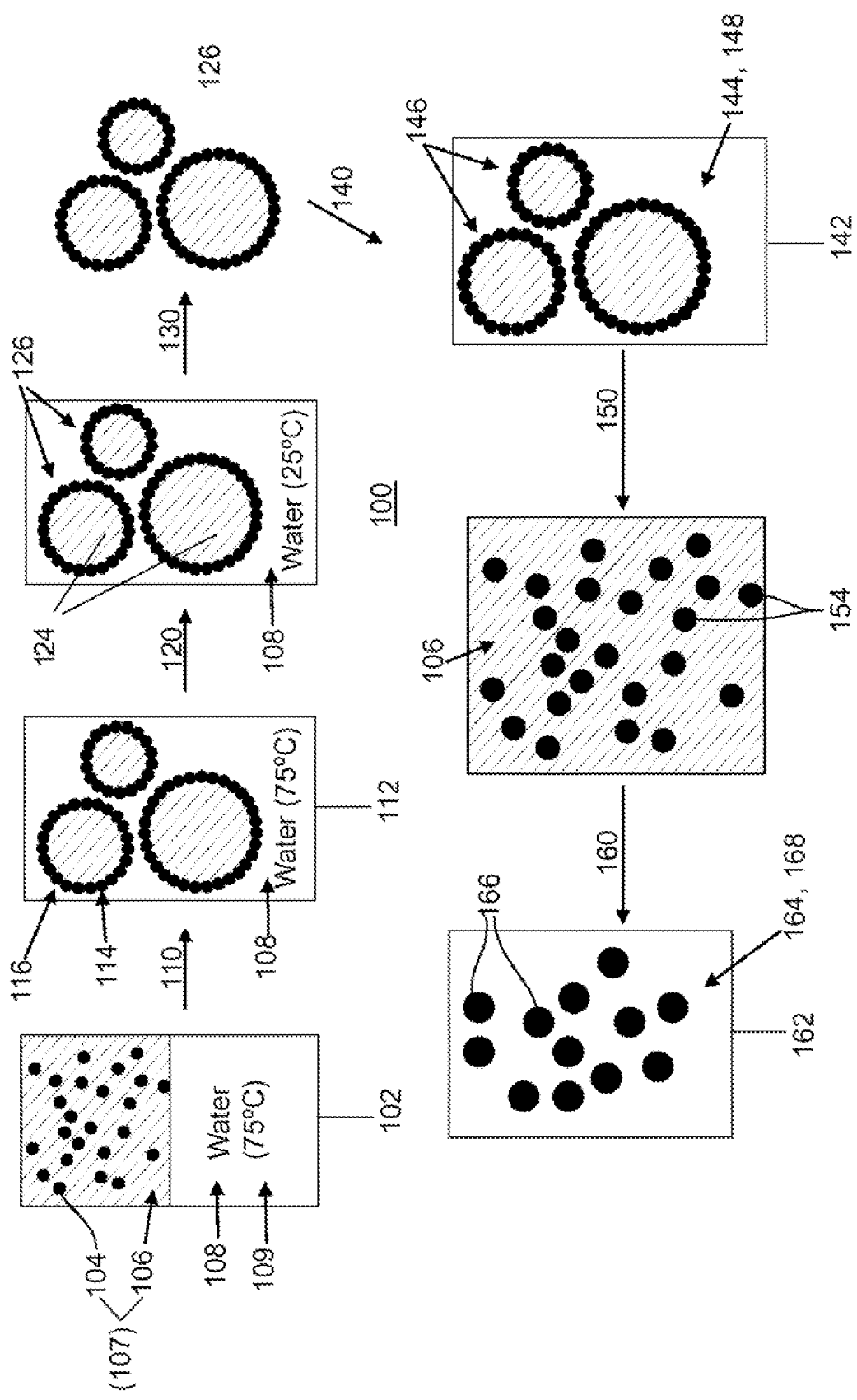
FIG. 1 depicts a schematic of a procedure to create Janus particles.

FIG. 1 represents an example of a process 100 for forming Janus particles. Process 100 includes processes 110, 120, and 140. Process 100 further includes processes 130, 150, and optionally, 160.

A mixture 102 is prepared that includes particles 104, a first liquid 106, a second liquid 108, and optionally, a surfactant 109. Optionally, the particles 104 and the first liquid 106 are combined initially to form mixture 107, which is subsequently combined with the second liquid 108 to provide the mixture 102.

The particles 104 include microparticles and nanoparticles. Preferred particles 104 include microparticles having a diameter greater than 100 nm, including 105 nm to 10 μm, such as 105, 150, 200, 300, 500, 600, 700, 800, and 900 nm and 1, 1.5, 2.0, 2.5, 5, 7.5, and 10 μm. An especially preferred particle 104 is a microparticle having a diameter of 800 nm to 5 μm, including 1.0, 1.5, 2.0, 2.5, 3.0, 3.5, 4.0, and 4.5 μm. Preferred particles 104 include nanoparticles having a diameter of 100 nm or less, including the range of 10 nm to 100 nm, such as 10, 20, 30, 40, 50, 60, 70, 80, 90, and 100 nm.

The particles 104 may have one of a variety of shapes, such as spherical, ellipsoid, rodlike, helical, and oblate, among others. The particles 104 may be solid or hollow. The particles 104 may be composed of any material, including polymers (for example, polystyrene, polypropylene, latex, polyacrylamide), polypeptides, proteins, nucleic acids, glass (for example, fused silica), ceramics (for example, $TiO_2$, $Al_2O_3$, $ZrO_2$), metals (for example, gold, silver, platinum, palladium or alloys), and chemical elements (for example, tungsten, titanium, carbon, etc.).

The particles 104 may be prepared by modifying precursor particles to possess modified surfaces bearing chemically reactive moieties. For example, precursor particles may be chemically modified to form particles 104 before their introduction into mixture 102 or optionally, mixture 107. Examples of modification include alkylation, amidation, esterification, metallation, phosphorylation, sulfonation, oxidation, reduction, and covalent attachment of additional chemical moieties that impart further chemical functionality to a precursor particle, among others. Examples of modified particles include those particles described in Suslick et al. (2003) and Lu et al. (2006).

The first liquid 106 and the second liquid 108 of mixture 102 are selected such that the overall surface energy of the liquid-liquid interface 114 is lowered upon addition and subsequent adsorption of particles 104 in formation of the emulsion 112 in process 110. Preferably, the first liquid 106 includes any organic polymer that undergoes that undergoes reversible melting.

Examples of preferred first liquids 106 include polymers and waxes. Waxes are water insoluble, organic materials that are solid or semi-solid at room temperature, usually of lower density than water, and typically can be melted above room temperature to form a liquid. Preferred waxes include any naturally occurring and synthetic waxes, wax esters, and greases that have a melting temperature of 30° C. or more, with a melting range of less than 10° C., and that are non-reactive with the reagents or solvents to which they are exposed.

Examples of first liquids 106 include esters of various long-chain (fatty) alcohols and long-chain acids, preferably where at least one member of the ester has 10 or more carbon atoms, including various unsaturated and branched chain types and also those esters of glycerols and sterols. Also, certain free alcohols or acids have wax-like properties of melting temperature and inertness. Examples of saturated fatty acids include capric, lauric, myristic, palmitic, margaric, stearic, arachidic, behenic, tetracosanic, lignoceric, cerotic, and melissic. Examples of unsaturated fatty acids include tiglic, hypogaeic, gaidic, physetoleic, elaidic, oleic, isooleic, erudic, brassidic, and isoerudic. Examples of fatty alcohols include octadecyl, carnaubyl, ceryl, melissyl, and phytol. Also included are various esters of these and other fatty acids with any suitable fatty alcohols, or sterols such as cholesterol, or glycerols.

Examples of first liquids 106 include natural or suitably modified waxes such as various plant derived waxes, greases and oils including carnauba wax, cranberry wax, ouricuri wax, candelilla wax, raphia wax, apple, cotton and cactus waxes; waxes (including greases) produced by bacteria (for example, cetyl stearate); fungi, protozoa and algae; various invertebrate waxes and greases including insect waxes such as beeswaxes (for example, triacontyl palmitate, palmatyl palmitate), and *Coccus* sp. derived waxes (for example, lac, cochineal and Chinese insect); and other animal fats (for example, triglycerides) and waxes including spermaceti (for example, cetyl palmitate), lanolin and wool grease. Also included are various derivatives, extracts, and combinations of these materials.

Examples of first liquids 106 include many natural or synthetic hydrocarbons such as white waxes, paraffins, ceresins, silicon greases and waxes, polychlorinated or polyfluorinated hydrocarbons, aromatic hydrocarbons (such as naphthalene and durene(1,2,4,5-tetramethylbenzene)), polyether waxes and polyester waxes. Waxes include waxy polymers, which are polymers that have wax-like chemical or physical properties alone or when combined with other waxes. Examples of waxy polymers include polyethylenes and polypropylenes. Examples of polymers that may be combined with waxes to produce waxy polymers include certain gums and rubbers, various kinds of latex, gutta-percha, balata, chicle and various derivatives. Also included are synthetic rubbers such as isoprene polymers, hydrogenated rubber, butadiene polymers, chloroprene polymers and butyl polymers.

Examples of first liquids 106 also include gelatin, guar gum, acacia (gum arabic), carob bean gum, carrageenan, xanthan gum, food starch, carboxymethyl cellulose, ethyl cellulose, methyl cellulose, cellulose acetate, cellulose nitrate, silcone rubber, butyl rubber, butadiene-styrene rubber, polyurethane, epoxy, polyvinyl alcohol, polyvinyl acetate, polydimethyl siloxane, urea formaldehyde, polyethylene, polyethylene glycol, polystyrene, polymethyl methacrylate, polypropylene, polyvinyl chloride, polyvinyl alcohol, polycarbonate, and polyamide. An especially preferred first liquid 106 is paraffin wax.

The solidification of the first liquid 106 may be induced in a variety of ways. Examples include a temperature change (for example, heating or cooling about the melting temperature), a photochemical process (for example, photopolymerization or photodepolymerization), and a chemical process (for example, a catalyst, an initiator, or inclusion or removal of a co-solvent). When the first liquid 106 is a wax, it is preferred to induce the solidification of first liquid 106 by lowering the temperature (for example, past a temperature about the melting temperature of the wax) or by removing a co-solvent (for example, a solvent that liquefies the wax).

The second liquid 108 includes any liquid that is immiscible with the first liquid 106 and does not solidify under the same conditions as the first liquid 106. A preferred second liquid 108 is water, particularly where the first liquid 106 is a wax. An especially preferred combination of the first and second liquids 106 and 108 is paraffin wax and water, respectively.

The surfactant 109 includes any surfactant that is soluble in the second liquid 108, such as an ionic surfactant or a non-ionic surfactant. Examples of ionic surfactants include cationic surfactants (for example, cetyltrimethyl-ammonium bromide (CTAB), hexadecyltrimethylammonium bromide (HTAB), dimethyldioctadecylammonium bromide (DDAB), and methylbenzethonium chloride (Hyamine™)) and anionic surfactants (for example, sodium dodecyl sulfate, sodium lauryl sulfate, lauryl dimethyl amine oxide, bile salts (such as sodium deoxycholate, sodium cholate)). Examples of non-ionic surfactants include polysorbates (Tween™), polyethoxylated alcohols, polyoxyethylene sorbitan, octoxynol (Triton X100™), N,N-dimethyldodecyl-amine-N-oxide, Polyoxyl 10 lauryl ether, Brij 721™, nonylphenol ethoxylate (Tergitol™), cyclodextrins, lecithin, among others. A preferred non-ionic surfactant is Tween 20. A preferred ionic surfactant is a cationic surfactant, such as DDAB.

The type of surfactant 109 selected for inclusion in process 100 depends upon the type of particle 104 that is selected for the mixture 102. For particles 104 having an ionic surface or coating, selection of a surfactant 109 having an ionic character opposite that of the particles 104 is preferred. For example, a cationic surfactant, such as DDAB, is a preferred surfactant 109 for particles 104 having an anionic surface, such as fused silica microspheres. For particles that have a mixed ionic surface composition (that is, containing both positive and negative charges), a preferred surfactant may include a mixture of ionic surfactants, or alternatively, a non-ionic surfactant.

When surfactant 109 is an ionic surfactant, the preferred amount of the surfactant 109 in the mixture 102 corresponds to a mass of the surfactant 109 of 10 parts per million (ppm) to 90 ppm of the mass of the second liquid 108, including 10, 15, 20, 25, 30, 35, 40, 45, 50, 55, 60, 65, 79, 75, 80, 85, and 90 ppm of the mass of the second liquid 108, as well as other amounts within that range. An especially preferred amount of the surfactant 109 in mixture 102 corresponds to a mass of the surfactant 109 of 20 to 60 ppm of the mass of the second liquid 108, such as 20 ppm. For example, if 10 g of the second liquid 108 is present in the mixture 102, then an especially preferred amount of surfactant 109 in mixture 102 corresponds to 200 µg of surfactant 109.

When surfactant 109 is a non-ionic surfactant, the preferred amount of surfactant 109 in the mixture 102 corresponds to a mass of the surfactant 109 of 20 parts per million (ppm) to 1000 ppm of the mass of the second liquid 108, including 20, 50, 100, 200, 300, 500, 600, 700, 800, 900, and 1000 ppm of the mass of the second liquid 108, as well as other amounts within that range. An especially preferred amount of the surfactant 109 in mixture 102 corresponds to a mass of the surfactant 109 of 100 to 1000 ppm of the mass of the second liquid 108, such as 500 ppm. For example, if 10 g of the second liquid 108 is present in the mixture 102, then an especially preferred amount of surfactant 109 in mixture 102 corresponds to 5 mg of surfactant 109.

The preferred amounts of the particles 104 in the mixture 102 corresponds to a mass of the particles 104 of 0.25% to 35% of the mass of the first liquid 106, including 0.25%, 0.5%, 1%, 5%, 10%, 15%, 20%, 25%, 30%, and 35% of the mass of the first liquid 106, as well as other percentages within that range. An especially preferred amount of particles 104 in mixture 102 corresponds to 20% of the mass of the first liquid 106. For example, if 1 g of the first liquid 106 is present in the mixture 102, then an especially preferred amount of particles 104 in mixture 102 corresponds to 0.2 g of particles 104.

The preferred mass ratios of the first liquid 106 to the second liquid 108 of mixture 102 is 1:1 to 1:20, including 1:1, 1:2, 1:3, 1:4, 1:5, 1:6, 1:7, 1:8, 1:9, 1:10, 1:12.5, 1:15, 1:17.5, and 1:20, as well as other ratios within that range. More preferably, the mass ratio of the first liquid 106 to the second liquid 108 in the mixture 102 is 1:5, 1:10, and 1:15. An especially preferred mass ratio of the first liquid 106 to the second liquid 108 is 1:10. For example, if 10 g of the second liquid 108 is present in the mixture 102, then 1 g of the first liquid 106 is present in mixture 102.

The preferred compositional amounts of the particles 104, the first liquid 106, the second liquid 108, and optionally the surfactant 109 in the mixture 102 may be determined based upon factors such as the quantity of Janus particle yield desired, the type of modification chemistries to be used, and the desired Janus balance of the resultant Janus particles, among other considerations. Preferred compositional ratios of the first particles 104, the first liquid 106, and the second liquid 108 in mixture 102 include the following (particles 104: first liquid 106: second liquid 108): 0.0025:1:1; 0.0025:1:2; 0.0025:1:3; 0.0025:1:4; 0.0025:1:5; 0.0025:1:6; 0.0025:1:7, 0.0025:1:8, 0.0025:1:9, 0.0025:1:10, 0.0025:1:12.5; 0.0025:1:15; 0.0025:1:17.5; 0.0025:1:20; 0.005:1:1; 0.005:1:2; 0.005:1:3; 0.005:1:4; 0.005:1:5; 0.005:1:6, 0.005:1:7, 0.005:1:8, 0.005:1:9, 0.005:1:10, 0.005:1:12.5; 0.005:1:15; 0.005:1:17.5; 0.005:1:20; 0.01:1:1; 0.01:1:2; 0.01:1:3; 0.01:1:4; 0.01:1:5; 0.01:1:6, 0.01:1:7, 0.01:1:8, 0.01:1:9, 0.01:1:10, 0.01:1:12.5; 0.01:1:15; 0.01:1:17.5; 0.01:1:20; 0.05:1:1; 0.05:1:2; 0.05:1:3; 0.05:1:4; 0.05:1:5; 0.05:1:6, 0.05:1:7, 0.05:1:8, 0.05:1:9, 0.05:1:10, 0.05:1:12.5; 0.05:1:15; 0.05:1:17.5; 0.05:1:20; 0.10:1:1; 0.10:1:2; 0.10:1:3; 0.10:1:4; 0.10:1:5; 0.10:1:6; 0.10:1:7; 0.10:1:8; 0.10:1:9; 0.10:1:10; 0.10:1:12.5; 0.10:1:15; 0.10:1:17.5; 0.10:1:20; 0.15:1:1; 0.15:1:2; 0.15:1:3; 0.15:1:4; 0.15:1:5; 0.15:1:6; 0.15:1:7; 0.15:1:8; 0.15:1:9; 0.15:1:10; 0.15:1:12.5; 0.15:1:15; 0.15:1:17.5; 0.15:1:20; 0.20:1:1; 0.20:1:2; 0.20:1:3; 0.20:1:4; 0.20:1:5; 0.20:1:6; 0.20:1:7; 0.20:1:8; 0.20:1:9; 0.20:1:10; 0.20:1:12.5; 0.20:1:15; 0.20:1:17.5; 0.20:1:20; 0.25:1:1; 0.25:1:2; 0.25:1:3; 0.25:1:4; 0.25:1:5; 0.25:1:6; 0.25:1:7; 0.25:1:8; 0.25:1:9; 0.25:1:10; 0.25:1:12.5; 0.25:1:15; 0.25:1:17.5; 0.25:1:20; 0.30:1:1; 0.30:1:2; 0.30:1:3; 0.30:1:4; 0.30:1:5; 0.30:1:6; 0.30:1:7; 0.30:1:8; 0.30:1:9; 0.30:1:10; 0.30:1:12.5; 0.30:1:15; 0.30:1:17.5; 0.30:1:20; 0.35:1:1; 0.35:1:2; 0.35:1:3; 0.35:1:4; 0.35:1:5; 0.35:1:6; 0.35:1:7; 0.35:1:8; 0.35:1:9; 0.35:1:10; 0.35:1:12.5; 0.35:1:15; 0.35:1:17.5; and 0.35:1:20. Thus, preferred compositions of mixture 102 include the particles 104 representing $1\times10^{-4}$ to $1.5\times10^{-1}$ of the total mass fraction of mixture 102; the first liquid 106 representing $5\times10^{-2}$ to 0.50 of the total mass fraction of mixture 102; and the second liquid 108 representing 0.42 to 0.95 of the total mass fraction of mixture 102. An especially preferred composition of mixture 102 includes 0.2 g of particles 104, 1.0 g of first liquid 106, and 10.0 g of second liquid 108.

The amount of surfactant 109 in the mixture 102 can determine the desired Janus balance for the final Janus particles. Though the amount of surfactant 109 present in the mixture 102 contributes to the overall composition of the mixture 102, the relative amount of surfactant 109 that represents the total mass fraction of mixture 102 may be insignificantly small compared to the other components (for example, the mass fraction of a cationic surfactant would represent $4.2\times10^{-6}$ to $8.8\times10^{-5}$ of the total mass fraction of mixture 102). Thus, the relative contribution of surfactant 109 may be ignored when calculating the amounts of the remaining components (that is, the particles 104, the first liquid 106, and the second liquid 108) required to prepare the mixture 102.

Referring again to FIG. 1, the mixture 102 is dispersed to form the emulsion 112 in process 110. When the surfactant 109 is added to the mixture 102 before process 110, the composition of the emulsion 112 is the same as mixture 102. Optionally, the surfactant 109 may be added to the mixture 102 during process 110 to form the emulsion 112. The emulsion 112 may be prepared by any means of dispersing the mixture 102, including sonicating, high pressure jet homogenizing, vortexing, mechanical mixing, magnetic stirring, and the like. An especially preferred process 110 is forming the emulsion 112 by magnetic stirring of the mixture 102.

Because emulsion 112 is formed by mixture 102, it does not matter how mixture 102 is prepared initially. While it may be convenient to form a first mixture containing particles 104 with a first liquid 106 and to form a second mixture containing surfactant 109 and a second liquid 108 in route to preparing mixture 102, this is not a requirement.

The emulsion 112 includes a liquid-liquid interface 114 between the first liquid 106 and the second liquid 108, with particles 104 adsorbed at the liquid-liquid interface 114. The liquid colloidosome 116 of emulsion 112 includes the first liquid 106 as an interior component and particles 104 as exterior components.

Figure 2:
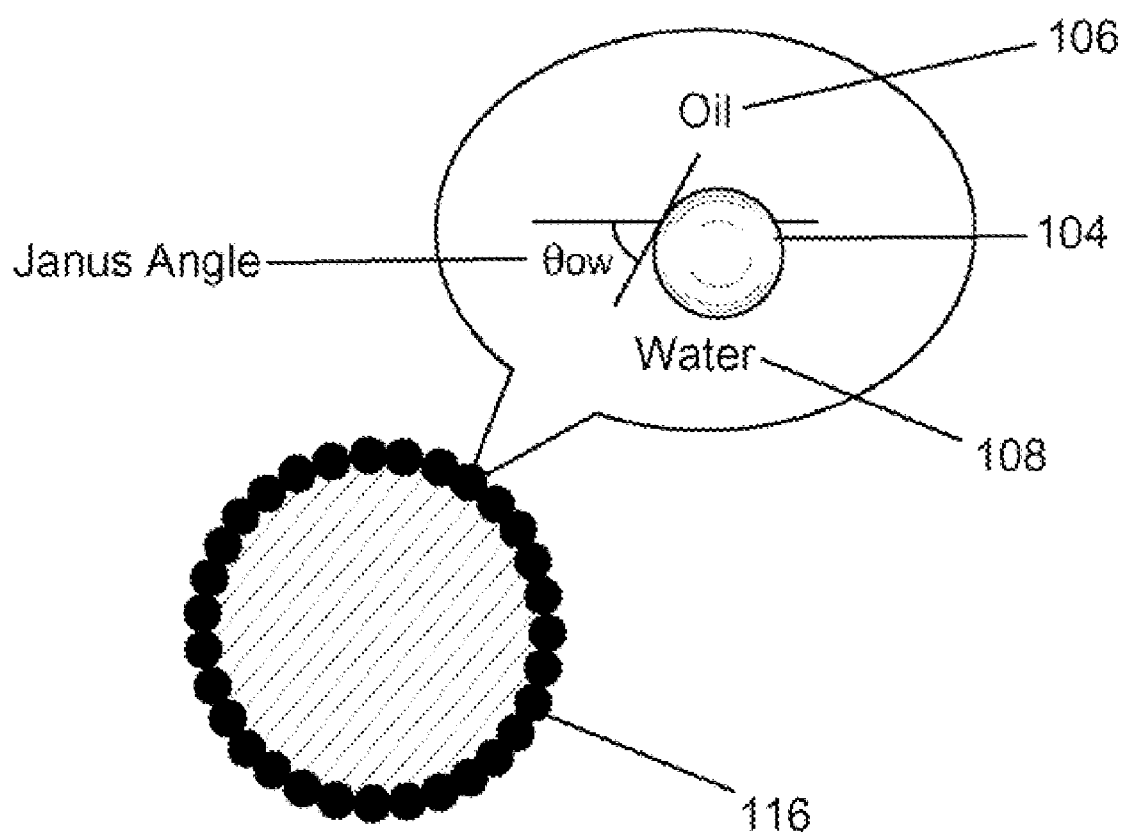
FIG. 2 depicts the Janus angle (depicted as $\theta_{ow}$) for a colloidosome 116 containing a particle 104, a first liquid 106 (exemplified by oil) and a second liquid 108 (exemplified by water)

The Janus angle refers to the three-phase contact angle formed between the particles 104, the first liquid 106, and the second liquid 108 at the interface of the liquid colloidosome 116 with the second liquid 108 (FIG. 2). A Janus angle of 90 degrees would correspond to a particle having 50% of its surface in contact with the liquid 106. A Janus angle of less than 90 degrees (for example, 50 degrees) would correspond to a particle having less than 50% of its surface in contact with the liquid 106. Preferred Janus angles for liquid colloidosome 116 range from 40 degrees to 90 degrees, including 40, 45, 50, 55, 60, 65, 70, 75, 80, 85, and 90 degrees. Even more preferably, Janus angles for liquid colloidosome 116 range from 45 to 70 degrees, such 50, 55, 60, and 65 degrees.

Referring again to FIG. 1, the first liquid 106 is solidified in process 120 to form the solid colloidosome 126. The solid colloidosome 126 possesses a solid interior 124 composed of the solidified form of the first liquid 106 and particles 104 fixed in place on the surface of the solid. Preferably, the particles 104 that are associated with the solid colloidosome 126 are partially embedded in the first liquid 106 that forms the surface of solid colloidosome 126 during process 120. Thus, particles 104 of solid colloidosome 126 have at least two different surfaces: (1) an embedded surface that is not exposed to solvent (that is, a blocked surface) and (2) a surface that is exposed (for example, to the second liquid 108 of emulsion 112).

The Janus balance of the resultant particle is correlated with the Janus angle of colloidosome 116, because the Janus angle reflects the extent to which the surface of the particle 104 contacts the solid interior 124 of the solid colloidosome 126. Preferred Janus balances range from 10% to 50%, including 10, 15, 20, 25, 30, 35, 40, 45, and 50%, as well as other percentages within that range. Even more preferably, Janus balances range from 25%-45%, such as 30, 35, and 40%.

In process 130 of FIG. 1, the solid colloidosomes 126 are collected. Suitable methods of collection include any means of separating the solid colloidosomes 126 from the remaining liquefied components of the emulsion 112, including the second liquid 108 and surfactant 109. Preferred collection methods include filtration, centrifugation, sedimentation, and magnetic separation, with the latter method being useful for particles having magnetic properties. An especially preferred collection method is filtration. Optionally, the solid colloidosome 126 may be washed to remove any unbound or weakly-adsorbed particles 104 and surfactants 109. Preferred washing solutions include water, methanol and ethanol, among others. Methanol is an especially preferred washing solution, particularly for removing the surfactant 109 from the solid colloidosome 126. Additional purification steps may be performed to further separate free particles 104 and surfactants 109 from the solid colloidosome 126.

In process 140, the solid colloidosomes 126 are chemically modified on the exposed surfaces of particles 104 to form modified colloidosomes 146. The solid colloidosomes 126 may suspended in solution 142 that includes one or more surface modifying agents 144. The solution 142 includes any liquid that preserves the integrity of the solid colloidosomes 126 and which solvates the surface modifying agents 144. Examples of the solution 142 include aqueous-based solvents like water or water-miscible solvents like polar protic solvents (for example, methanol, ethanol, etc.) or polar aprotic solvents (for example, dimethylformamide, dimethylsulfoxide, pyridine, acetone, etc.).

Optional additional components 148 may be included in the solution 142 of process 140, including buffering agents, acids, bases, salts, chaotropic agents, micellar agents, denaturants, renaturants, and the like.

The surface modifying agents 144 include any reagent suitable for adding chemical functionality to the exposed surface of particles 104 of the solid colloidosomes 126. Examples of the surface modifying agents 144 include alkylating agents, amidating agents, esterification agents, metallation agents, phosphorylating agents, sulfonating agents, oxidizing agents, reducing agents, or other chemistries that can add chemical functionality to the exposed surface of particles 104.

The exposed surface of particles 104 may also be modified directly using electromagnetic radiation, such as radiation in the infrared, ultraviolet, and visible wavelength ranges. Optionally, the surfaces of particles 104 may also contain reactive moieties that are responsive to electromagnetic radiation of specific wavelengths, thereby permitting further modification following irradiation.

Depending upon the complexity of modifications desired on particles 104 of the solid colloidosomes 126, a plurality of processes 140 may be performed sequentially, with each process 140 specific for adding a particular chemical functionality to the exposed surface of the particles 104. Preferably, the modified colloidosomes 146 are collected after each process 140 is completed. Any suitable collection process may be used for recovering the modified colloidosomes 146, such as those described for process 130. The obtained modified colloidosomes 146 may be extensively washed to remove solution 142, surface modifying agents 144, and any additional components 148.

In process 150, the modified colloidosomes 146 are treated to remove the solid interior 124, releasing the Janus particles 154. The colloidosomes 146 can be treated in a variety of ways to remove solid interior 124, such as by using a solvent to dissolve the solid interior 124 or by using heat to melt the solid interior 124. Preferably, the Janus particles 154 do not dissolve or react with a solvent used to dissolve the solid interior 124. Preferably, the Janus particles 154 do not melt at the elevated temperature required to melt the solid interior 124. For colloidosomes 146 that include paraffin wax as the solid interior 124, process 150 includes treating the colloidosomes with a solvent, such as chloroform. The Janus particles 154 are subjected to collection using any separation and purification method available, including those described for process 130.

In process 160, the Janus particles 154 may be subjected to additional modification using chemistries to modify the second, previously blocked, side of the particles 104 to form modified Janus particles 166. The Janus particles 154 are suspended in a solution 162 that includes one or more surface modifying agents 164 and optional additional components 168. Additional components 168 may include those that are described as optional additional components 148 of process 140. Solution 162 includes any liquid that preserves the integrity of the Janus particles 154 and which solvates the surface modifying agents 164. The range of modification chemistries possible in process 160 may be greater than those possible in process 140, because preserving the integrity of the solid colloidosome 126 is no longer a consideration. Consequently, process 160 may include a broader range of solutions 162 than possible for solutions 142 of process 140, including both aqueous and organic solvents, as well as a broader range of surface modifying agents 164 than possible with surface modifying agents 144 of process 140.

Depending upon the complexity of modifications desired for the Janus particles 154, a plurality of processes 160 may be performed sequentially, with each process 160 specific for adding a particular chemical functionality to the surface of the Janus particles 154. Preferably, the modified Janus particles 166 are collected after each process 160 is completed. Any suitable collection process may be used for recovering the Janus particles 166, such as those described for process 130. The obtained Janus particles 166 may be extensively washed to remove solution 162, surface modifying agents 164, and any additional components 168.

The Janus angle of a colloidosome can be determined by removing at least a portion of the particles 104 from solid colloidosomes 126, imaging the resultant solid colloidosomes 126 with scanning electron microscopy (SEM), and measuring the three-phase contact angle of the voids left by the removed particles 104. Preferably, a plurality of individual three-phase contact angles is measured for one or more colloidosomes 126, and an averaged, three-phase contact angle determined by calculation.

The Janus balance may be determined by analyzing the Janus particles 154 or 166 themselves, such as by measuring the extent of surface modification achieved by a specific surface modifying agent during process 140.

One can infer the extent of particle coverage due to a surface modification on a particle having a known Janus balance. For example, a particle having a Janus balance of 35% that is subjected to surface modification with gold during process 140 refers to a particle having 65% of its surface covered with gold.

One possible explanation for the tunability of the Janus balance is that the surfactant 109 binds to the surface of the particles 104 and changes the surface hydrophobicity of the particles 104. With an apparent increase in surface hydrophobicity, the particles 104 can enter the first liquid 106 more deeply than if the surfactant 109 were omitted from the emulsion 112. Typically, the greater the hydrophobic character of the surfactant 109, the more deeply the particles 104 can enter the first liquid 106.

For particles 104 having a hydrophilic surface (for example, an ionic surface), the desired Janus balance can be achieved by altering the hydrophilic-hydrophobic composition of the particle surface with a hydrophobic surface modifying agent other than the surfactant 109. Janus particles of the desired Janus balance may be prepared by using pre-modified particles 104 in process 100, thereby eliminating the use of the surfactant 109 in the emulsion 112.

Figure 9:
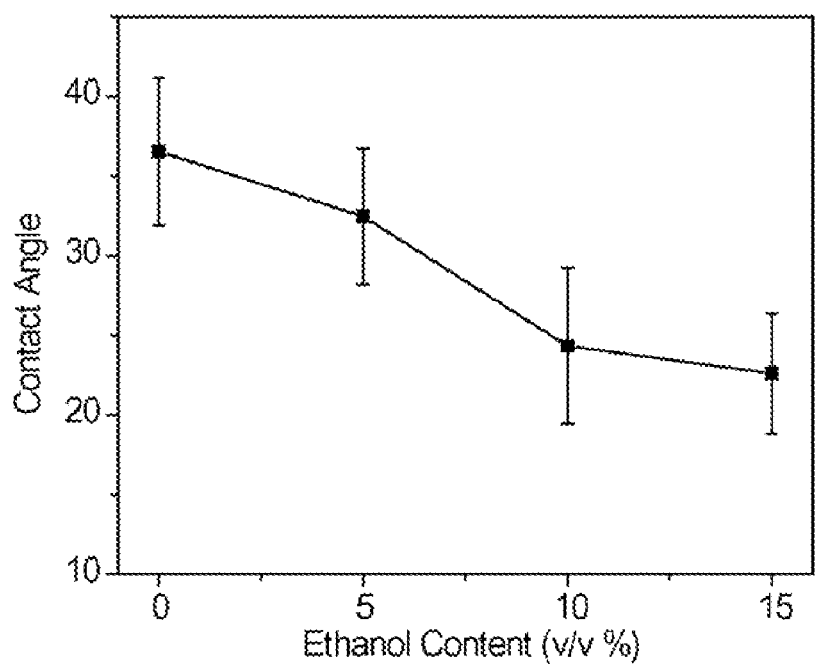
FIG. 9 depicts the relationship between the Janus angle and the concentration of ethanol relative to the water phase.
Figure 10:
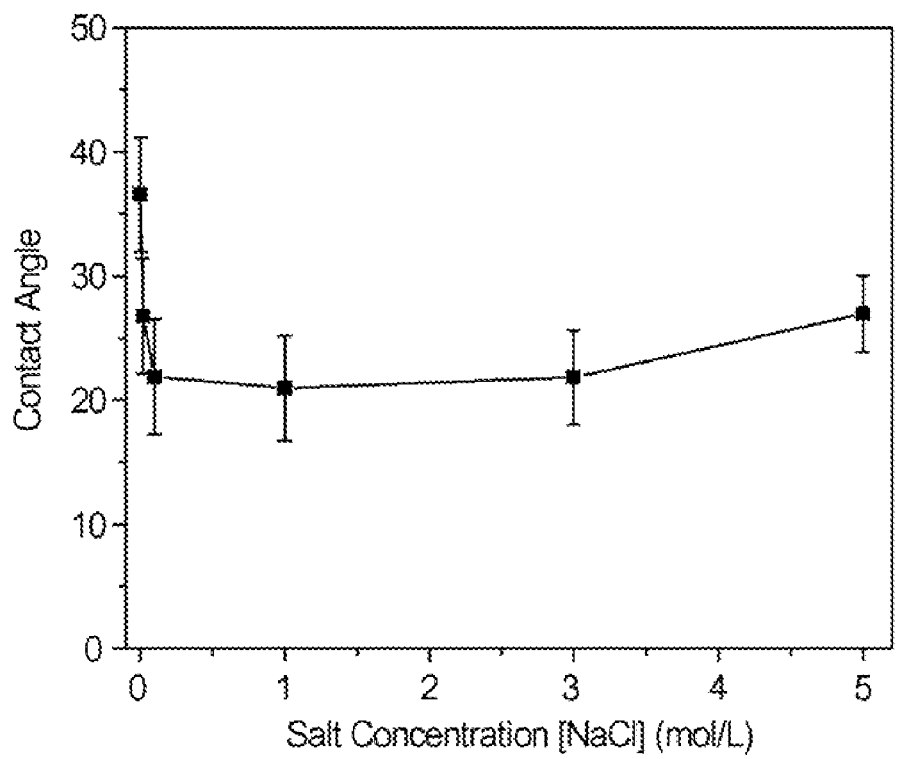
FIG. 10 depicts the relationship between the Janus angle and the concentration of salt relative to the water phase.
Figure 11:
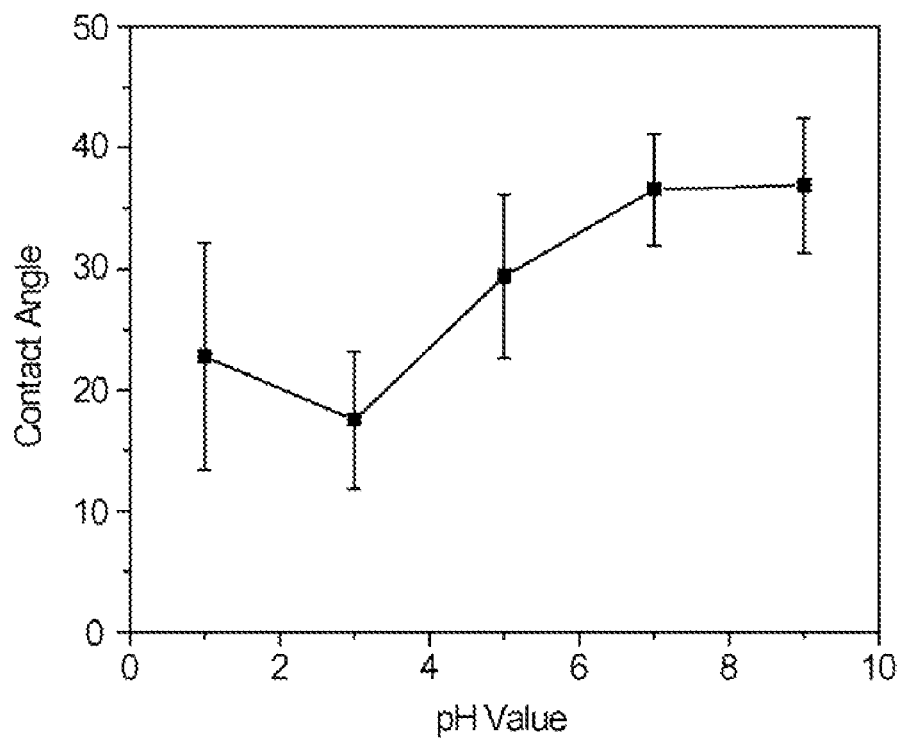
FIG. 11 depicts the relationship between the Janus angle and the pH value.

Besides the use of a surfactant 109 in process 100, Janus particles having a desired Janus balance may be prepared by modifying the pH and ionic strength of emulsion 112. For example, Janus particles having a desired Janus balance may be prepared with an emulsion 112 containing a liquid 108 (for example, water) having the pH adjusted to a specific pH (pH 1-11) or having a specific ionic strength (adjusted through inclusion of 0-5 M monovalent salt in liquid 108, such as NaCl or KCl). FIGS. 10 and 11 illustrate the effects of ionic strength and pH, respectively. Additionally, inclusion of an alcohol, such as ethanol, to a volume fraction of 0-15% of liquid 108 (for example, water), including a volume fraction of 1%, 2.5%, 5%, 7.5%, 10%, 12.5%, and 15% (as well as other percentages within that range), may be used in process 100 to fine tune the Janus balance of the resultant Janus particles. FIG. 9 illustrates the effect of alcohol. One possible explanation for the tunability of the Janus balance with these different conditions (inclusion of surfactant 109 or alcohol, or adjustment of the pH or ionic strength) is that each condition varies the surface tension of the liquid 108 in emulsion 106.

Process 100 can provide a dramatic improvement in the yield of Janus particles obtained when compared to traditional synthetic methods that use two-dimensional monolayers. For example, process 100 can provide Janus particle yields that are about two orders of magnitude greater than possible with traditional methods. Furthermore, the inclusion of a surfactant 109 in the emulsion 112 can result in improved synthetic yield of Janus particles. For example, inclusion of the cationic surfactant DDAB in an emulsion 112 containing fused silica microspheres resulted in a yield of 80% of Janus particles, as compared to a yield of 50% of Janus particles when the surfactant 109 was omitted.

One possible explanation for the improved yield is that the inclusion of a surfactant 109, particularly an ionic surfactant having a charge that is opposite to that of particles 104, may reduce electrostatic charge repulsion between particles 104. The resultant particles 104 may pack more efficiently at the interface 114 of colloidosome 116 and on the surface of solid colloidosome 126. A more efficient packing geometry for particles 104 may yield more robust colloidosomes 126 that contain or retain a greater number of particles 104 for subsequent modification.

Figure 12:
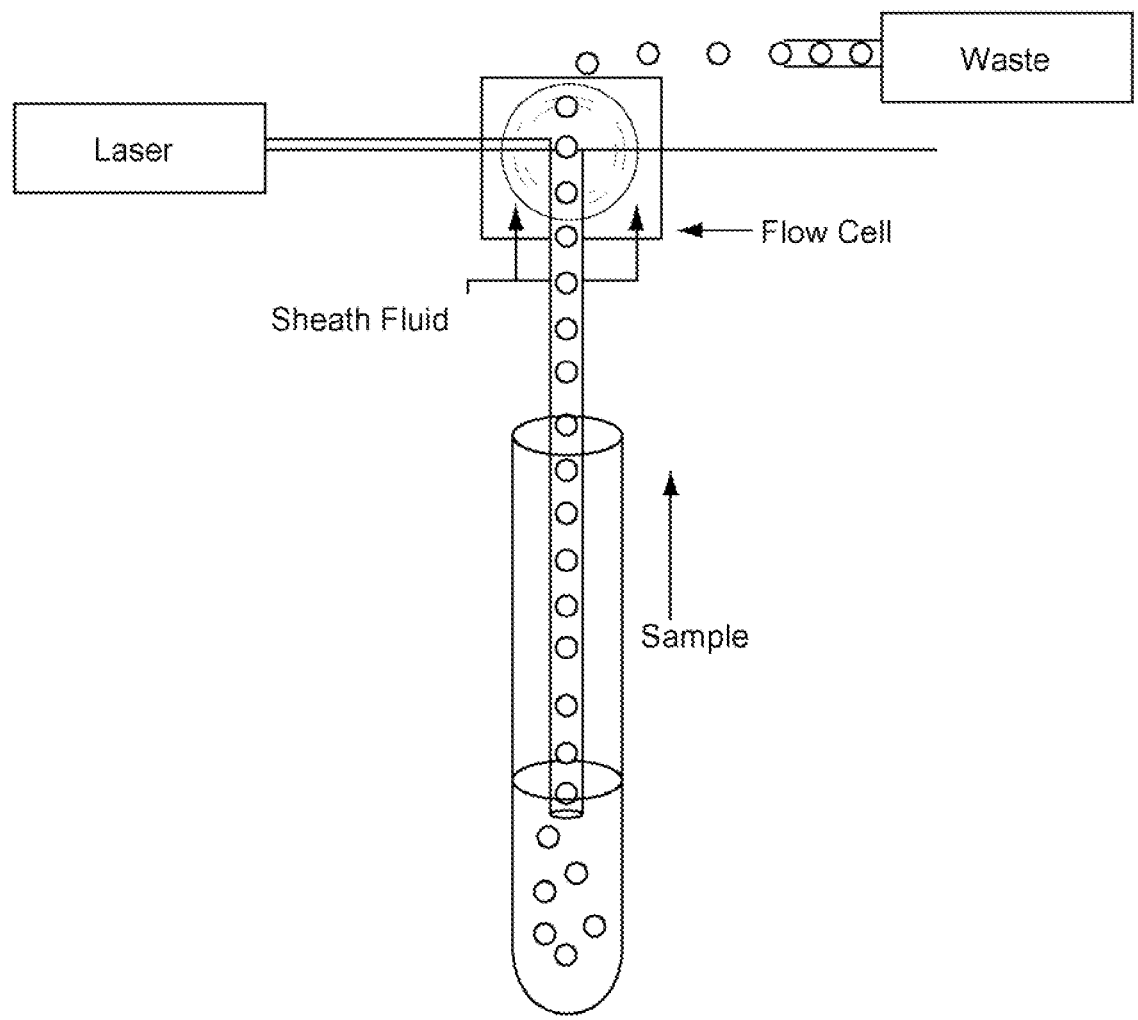
FIG. 12 illustrates a flow cytometry setup.
Figure 13:
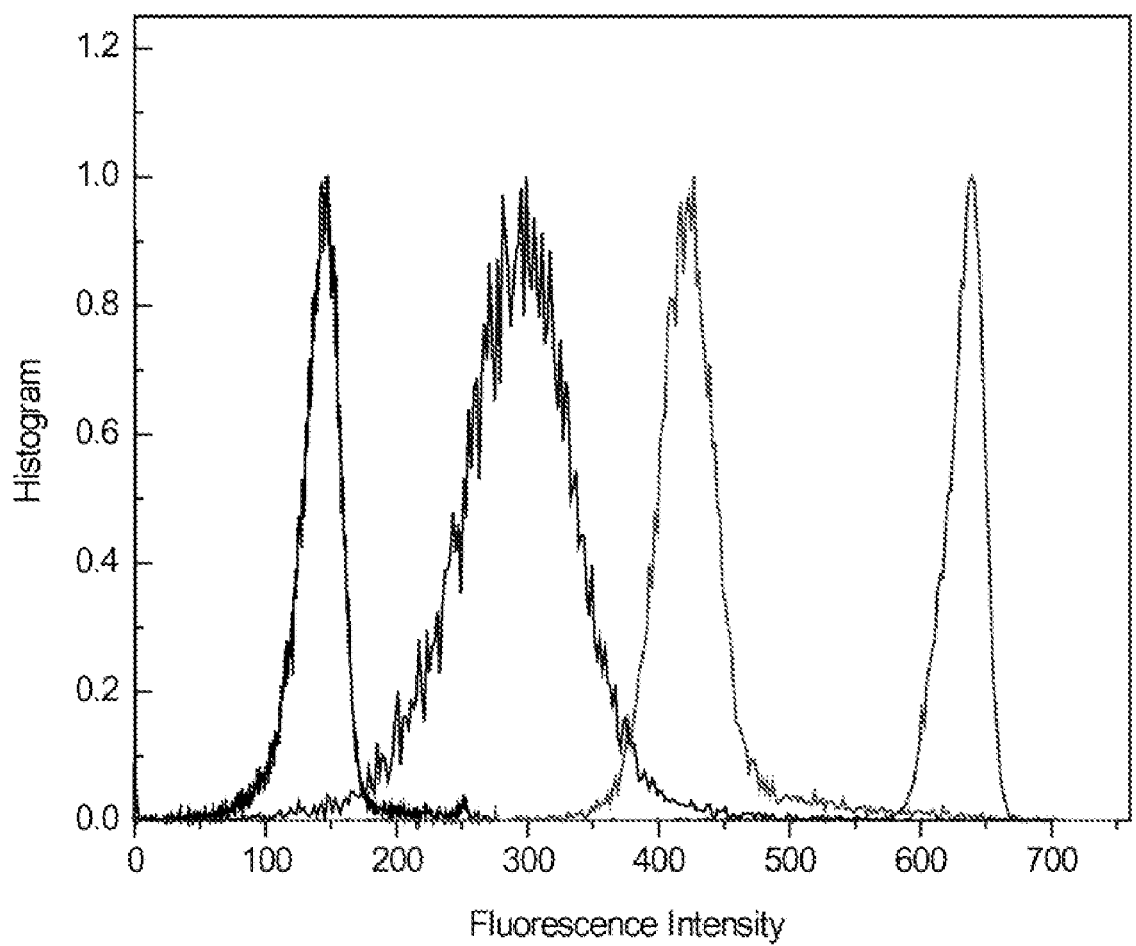
FIG. 13 depicts the distribution of particles, as analyzed by flow cytometry.

In addition to improved Janus particle yield, the purity of the Janus particles produced with process 100 is increased relative to Janus particles obtained with traditional methods. For example, analysis of the Janus particles made according to process 100 by flow cytometry indicates that the particles are uniform in composition and possess the expected surface coverage. FIG. 12 illustrates the flow cytometry setup. FIG. 13 show the distribution of particles analyzed by flow cytometry. In FIG. 13, dark area represents the area with lower fluorescence intensity; from left to right, the particles are: (1) homogeneous particles, which were modified by DCDMS first, then were labeled by APS-FITC; (2) Janus particles, the exposed area on the colloidosome was DCDMS modified first, and then inside was labeled by APS-FITC; (3) Janus particles, the exposed area on the colloidosome was labeled directly by APS-FITC; (4) homogeneous particles, which were labeled directly by APS-FITC.

Figure 3A:
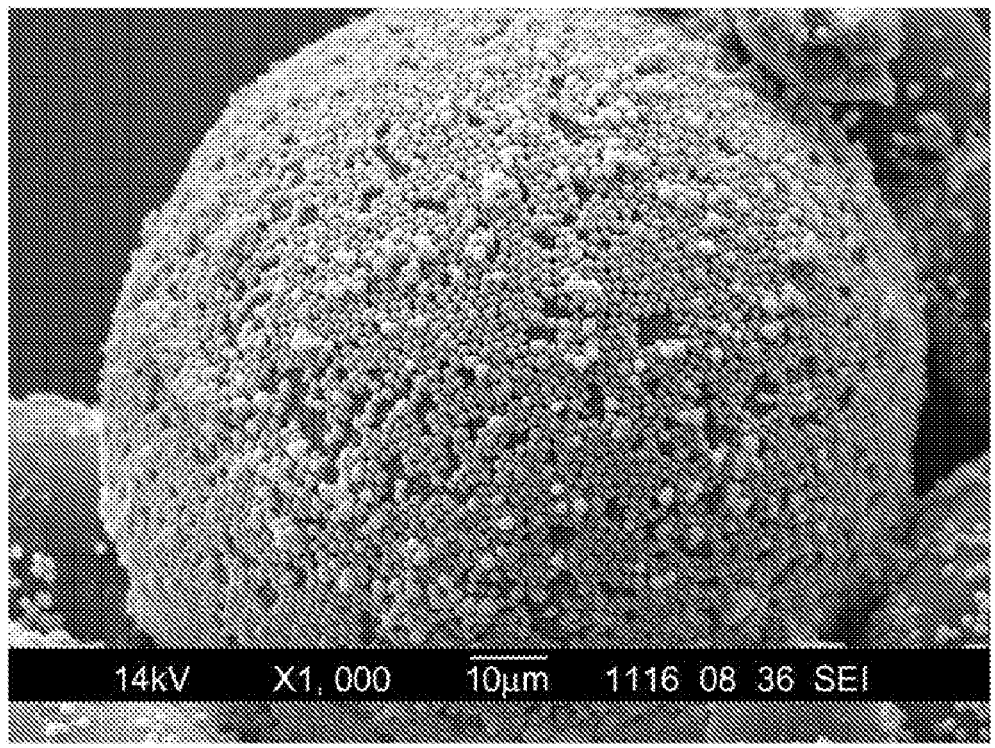
FIG. 3A depicts a scanning electron micrograph image of particles adsorbed onto the surface of a solidified colloidosome.
Figure 3B:
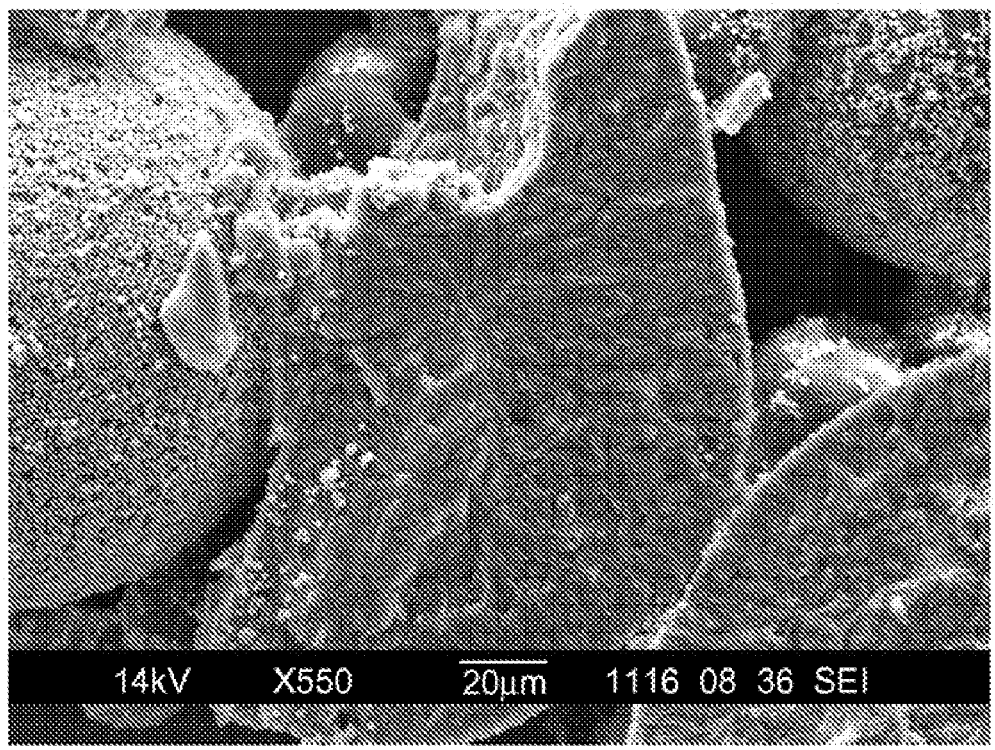
FIG. 3B depicts a scanning electron micrograph image of a broken solidified colloidosome.

FIGS. 3A and 3B show SEM images of illustrative solid colloidosomes prepared according to process 120. The particles 104 were adsorbed on the surfaces of the solid colloidosomes 126. When emulsion 112 was cooled to a temperature below the melting temperature of the first liquid 106 (paraffin wax), the particle 104 monolayer surface coverage remained high (FIG. 3A). When the first liquid 106 solidified as a wax, particles 104 were locked in place and ceased to rotate. An examination of broken wax emulsions showed that >99% of the particles were located at the emulsion surface (FIG. 3B), having been adsorbed to this surface from prior dispersion in the wax phase.

The solid colloidosomes 126 of FIGS. 3A and 3B survived multiple washings, suggesting good mechanical stability. Nearly all particles 104 continued to remain at the surface, indicating fairly strong adsorption between particles 104 and the solid interior 124. Strong particle-colloidosome surface adsorption provided the feasibility for performing sequential chemical modifications on these adsorbed particle surfaces according to process 140.

The examples provide illustrations of the types of Janus particles that may be fabricated according to process 100, including bipolar particles (cationic on one side and anionic on the other side) and colloidal surfactants (charged on one side and hydrophobic on the other). However, an expansive variety of Janus particles are possible, being limited only by the types of particles 104 that may be used to form the colloidosomes 116 and 126 (including use of pre-modified particles), the efficiency whereby solid colloidosomes 126 are formed, and the compatibility of the particle modification chemistries possible for both the solid colloidosomes 126 and released Janus particles 154.

Figure 4A:
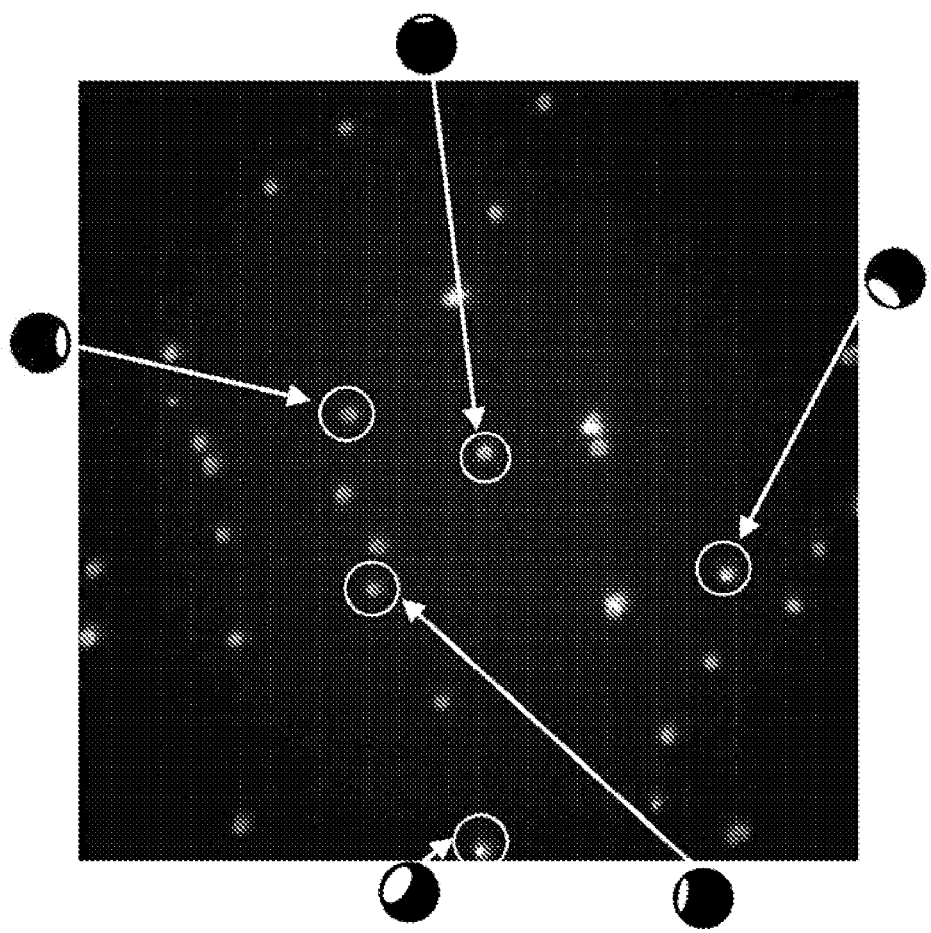
FIG. 4A depicts an epifluorescent image of Janus particles modified with a rhodamine B isothiocyanate group.
Figure 4B:
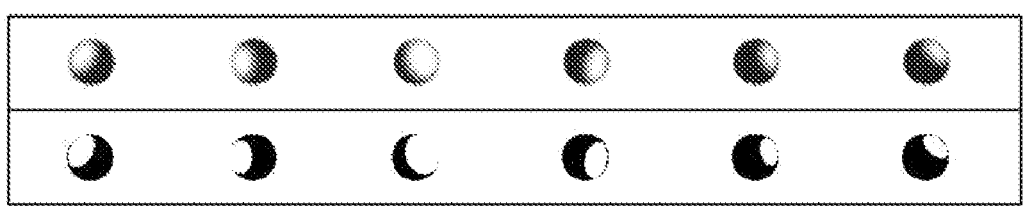
FIG. 4B depicts a time-dependent rotation of epifluorescent images of the particles of FIG. 4A.

The efficacy of Janus particle surface chemical modification was confirmed by demonstrating that only one side of the particles was fluorescent following chemical modification of a solid colloidosome 126 with a fluorescent label. FIG. 4A shows a time sequence of epifluorescence images that illustrates that the bipolar particles rotate in an aqueous suspension, consistent with the Janus particles having only one fluorescent side. The silica particles are opaque, and because of the asymmetric coating by the dye, the particles display fluorescence having an intensity that differs according to their orientation with respect to the illumination direction. FIG. 4B illustrates a sequence of snapshots for one typical particle that tracks the particle's rotation, by Brownian motion, to different orientations.

Figure 5A:
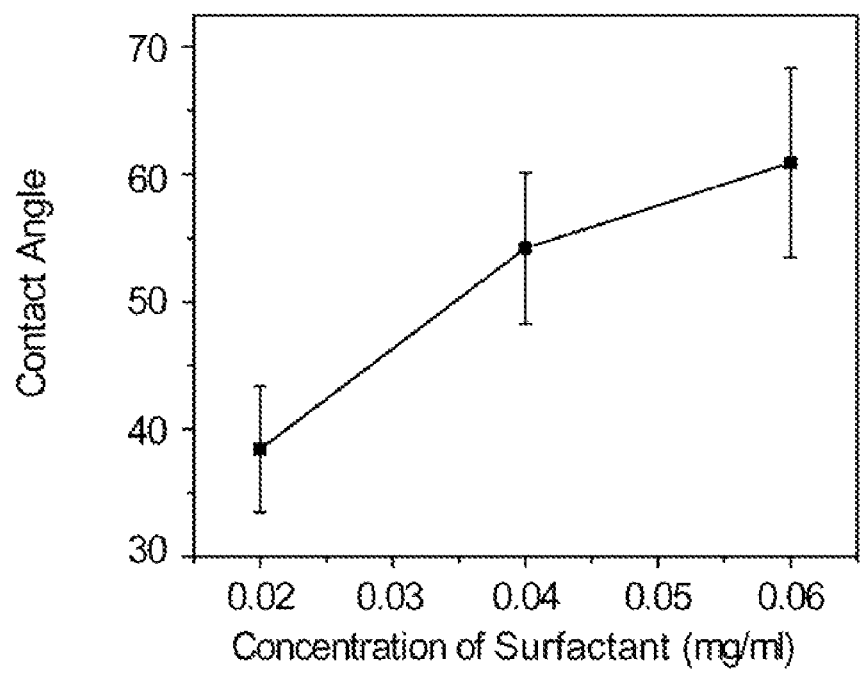
FIG. 5A depicts the relationship between the Janus angle and the concentration of a cationic surfactant (DDAB)
Figure 5B:
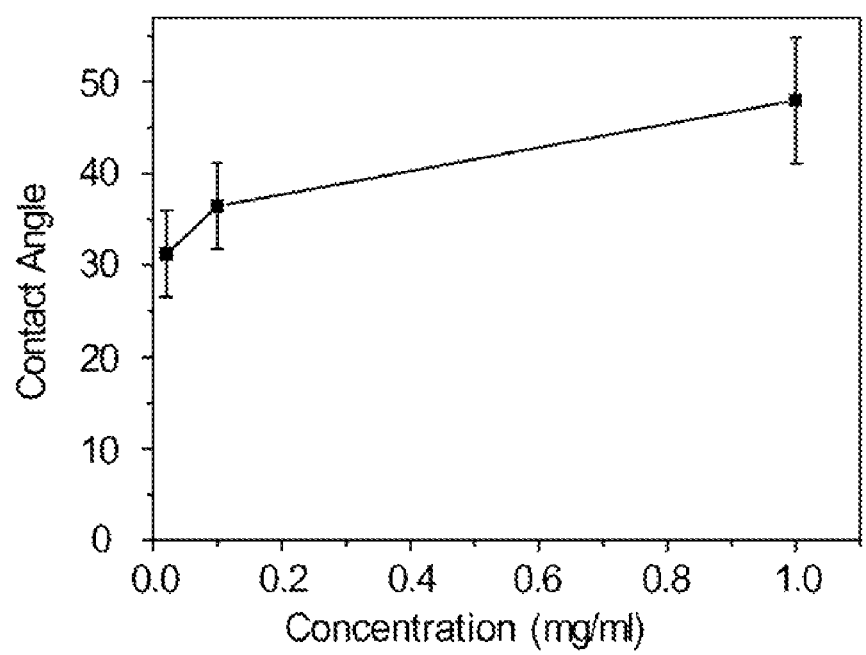
FIG. 5B depicts the relationship between the Janus angle and the concentration of a non-ionic surfactant (Tween 20)
Figure 8:
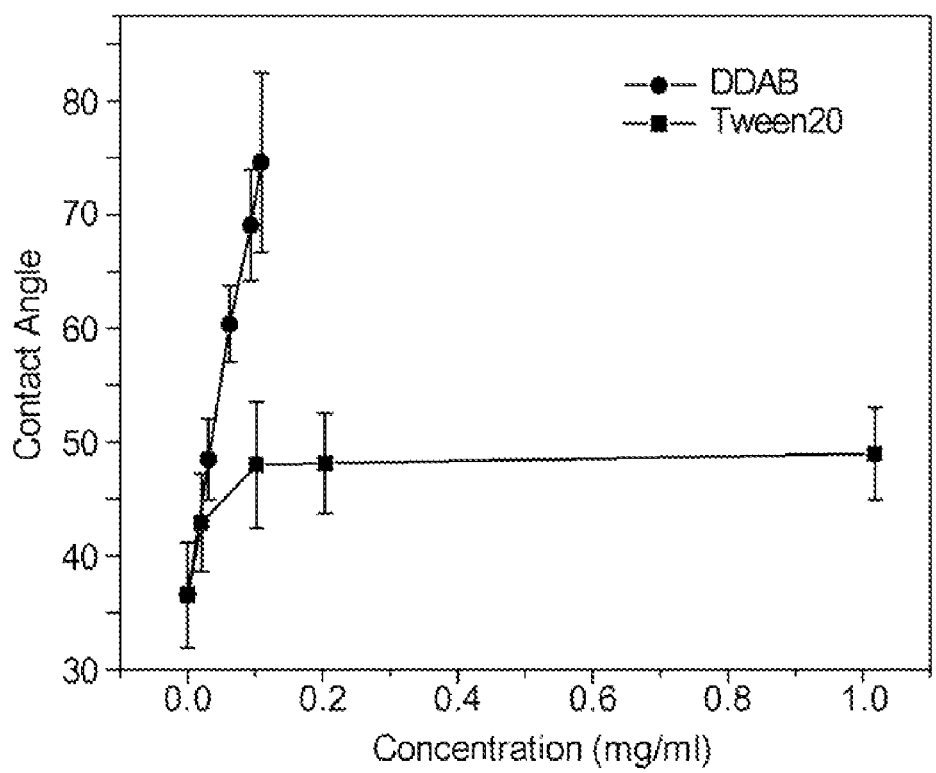
FIG. 8 depicts the relationship between the Janus angle and the concentration of surfactant (DDAB and Tween 20).

The control of the Janus angle was confirmed by analyzing the three-phase angle of voids left by the escaped particles 104 in colloidosomes 126. With the inclusion of a cationic surfactant in the emulsion 112 (for example, 20 mg/L to 60 mg/L of DDAB in water), the Janus angle was varied from 35 degrees to 70 degrees (FIG. 5A). With the inclusion of a non-ionic surfactant in the emulsion 112 (for example, 20 mg/L to 1 mg/ml of Tween 20 in water), the Janus angle was varied from about 30 degrees to about 55 degrees (FIG. 5B). Thus, the type of surfactant included in the emulsion 112 can influence the Janus angle of the formed colloidosomes and the Janus balance of the resultant Janus particles. FIG. 8 shows the data of FIGS. 5A and 5B on a single graph.

Applications

The Janus particles of the present invention find utility in numerous applications, depending upon their compositional nature and Janus balance. For example, bipolar particles that display charge asymmetry can undergo self-assembly wherein the surface charge asymmetry of the resultant clusters is preserved. Such model particle systems may be used to study the aggregation state of proteins that form aggregates where the surface charge distribution is similarly patchy.

Janus particles containing magnetically and fluorescently labeled surfaces have applications in new tools for the exploration of optical, chemical, and materials properties of surrounding environments. For example, such particles can be used in nanoinstruments, such as nanoviscometers, nanothermometers, nanobarometers, and nanochemical sensors. Modulation of these optical particles in magnetic fields allows for the local optical, chemical, and materials properties to be distinguished from the bulk properties.

Other applications include forming intracellular chemical images with improved signal over background noise, optical contrast agents for use in medical imaging methodologies like optical coherence tomography, and magnetic contrast agents for use in magnetic resonance imaging. Furthermore, high sensitivity immunoassays with simpler procedures are possible, as well as measurements of viscosities at chosen time and size scales, observation of microvorticity in fluids, and monitoring of microfluidic device performance. Finally, such particles should have applications in simultaneous intracellular physical and chemical imaging.

EXAMPLES

Fused silica particles used in these experiments were 800 nm and 1.5 μm in diameter, obtained from Alfa Aesa and Tokuyama, respectively. The particle surfaces were prepared for subsequent chemical modification in the following manner. The particles were initially treated with a pirahna solution, followed by recovery of the particles by centrifugation and drying at 80° C. under vacuum. The paraffin wax used in these experiments had a melting point of about 55° C. Both (aminopropyl) triethoxysilane (APS) (99%) and n-octadecanetrichlorosilane (OTS) were purchased from Aldrich. To produce fluorescent-labeled APS, rhodamine B isothiocyanate was attached to APS using a procedure described in the literature. Before OTS was used in these experiments, it was freshly purified by distilling it under vacuum.

Example 1

Fabrication of Janus Particles

Fused silica particles (0.2 g) were dispersed homogeneously in paraffin wax (1 g) that was pre-heated at 75° C. The resultant suspension was then mixed with deionized water (10 g) that was pre-heated at 75° C. The emulsions were produced by subjecting the resultant mixture to magnetic stirring at 1600 rpm for 1 h. Upon cooling the emulsion to room temperature, the paraffin wax droplets of the emulsion became a solid.

Deionized water was used to wash the wax emulsions multiple times to remove particles in the aqueous solution as well as weakly attached particles. The resulting exposed surfaces of particles attached to the emulsions were allowed to react chemically with 2 mM labeled APS in methanol solution for 30 min. The reaction solutions were washed with methanol to remove excess silane.

The wax was dissolved in chloroform at room temperature to release the particles. The resulting particles were further modified chemically. For example, those particles that had been allowed to react with APS on one surface could be further allowed to react with OTS (on the second surface), producing particles that were cationic on the APS side and hydrophobic on the OTS side.

Example 2

Characterization of the Janus Particles

Scanning electron microscopy, SEM (JEOL 6060 LV), was used to image the emulsions. Prior to imaging, a thin layer of gold was evaporated onto them to render them electrically conductive, to avoid surface charging in the electron beam.

A combination of optical imaging and epifluorescence imaging techniques were used to determine chemical composition of the particles. Optical imaging was performed with a Zeiss Axiovert 200 microscope fitted with a 40× objective. For epifluorescence imaging, 532 nm illumination (a Nd:YAG laser) was used and the laser beam was focused at the back focal point of a 63× air objective. The fluorescence images were collected using this same objective and recorded using an electron multiplying CCD camera (Andor Ixon) after filtering out light from the excitation laser. Images of particle rotation were recorded with an exposure time of 0.1 s for 800 frames.

Example 3

Fabrication of Colloidosomes Having Janus Angles of 38±2 Degrees and 63±4 Degrees Janus particles were prepared according to Example 1 using mixtures that contain 1 mg/ml or 3 mg/ml of the cationic surfactant, DDAB, in the water phase. Following cooling of the emulsion to room temperature, the solid colloidosomes were collected by filtration, and washed extensively with methanol to remove the surfactant.

Figure 6A:
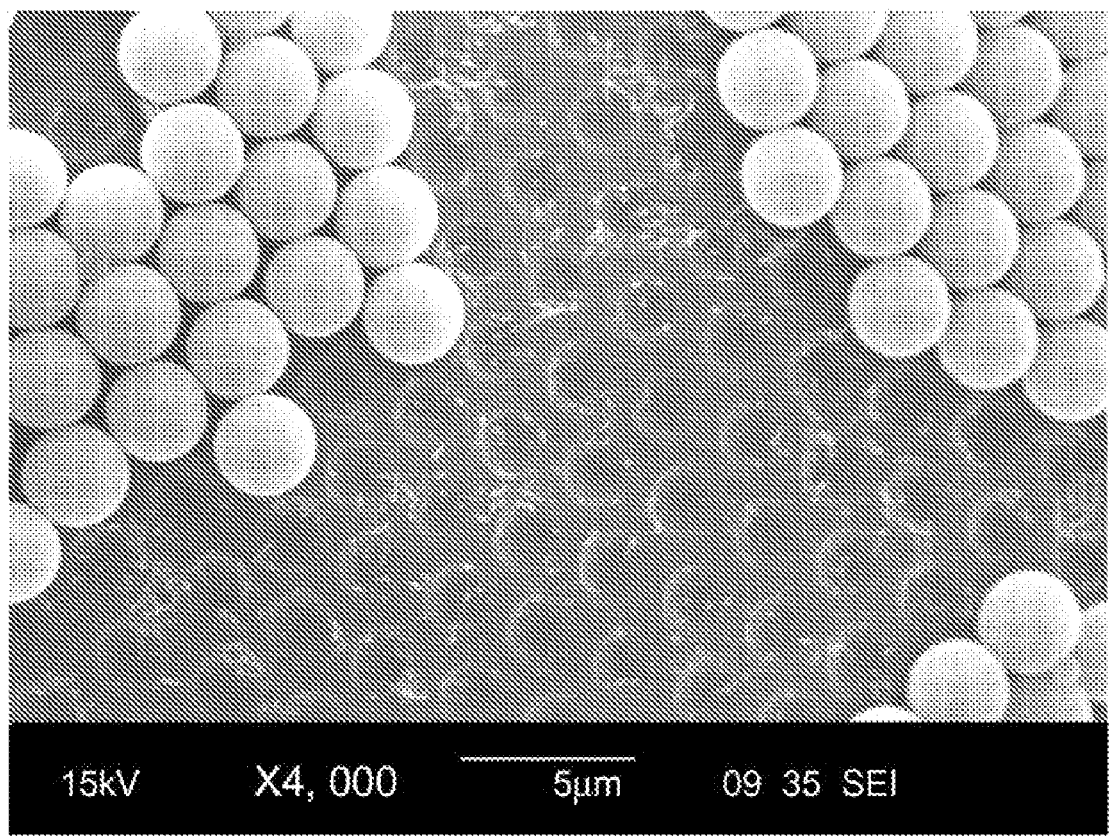
FIG. 6A depicts a scanning electron micrograph image of a solidified colloidosome surface formed in the presence of a cationic surfactant (DDAB) at a concentration of 1 mg DDAB in 50 ml of water (representing the second liquid)
Figure 7A:
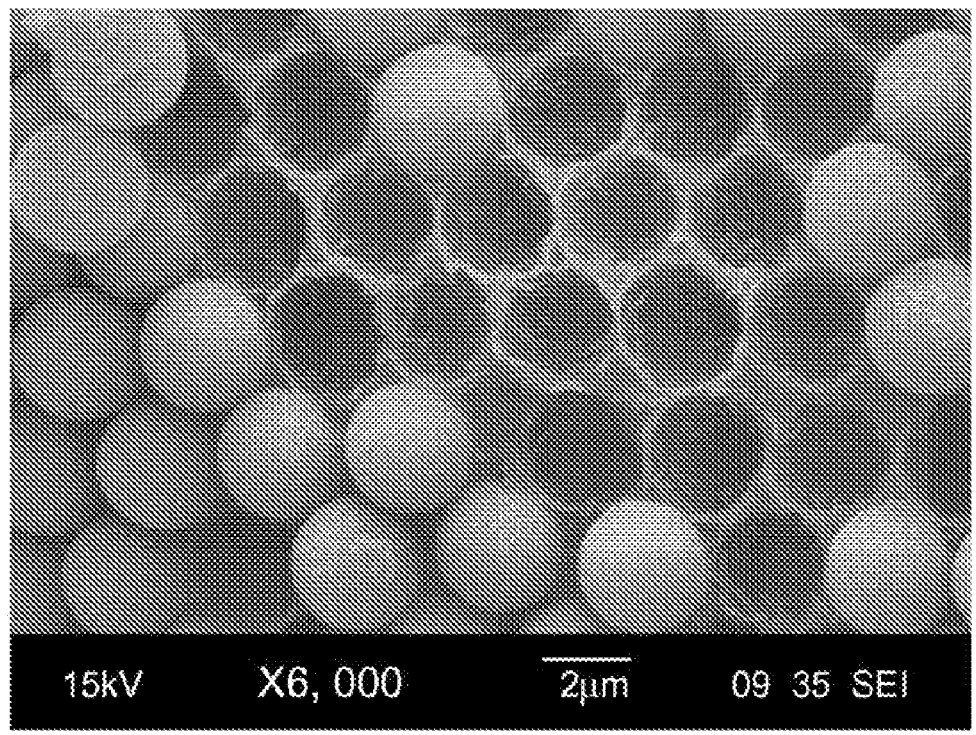
FIG. 7A depicts a scanning electron micrograph image of a solidified colloidosome surface formed in the presence of a cationic surfactant (DDAB) at a concentration of 3 mg DDAB in 50 ml of water (representing the second liquid)

FIGS. 6A and 7A depict scanning electron microscopy images of the solid colloidosomes prior to chemical modification. Prior to imaging, a thin layer of gold was evaporated onto them to render them electrically conductive, to avoid surface charging in the electron beam.

Figure 6B:
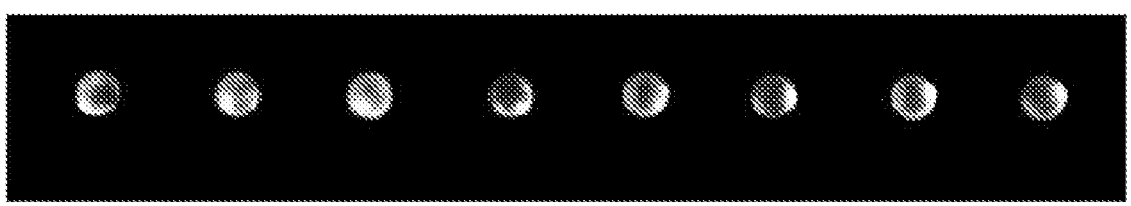
FIGS. 6B and 6C depict time-dependent rotation of epifluorescent images of the Janus particles of the colloidosome of FIG. 6A after modification with a rhodamine B isothiocyanate group.
Figure 6C:
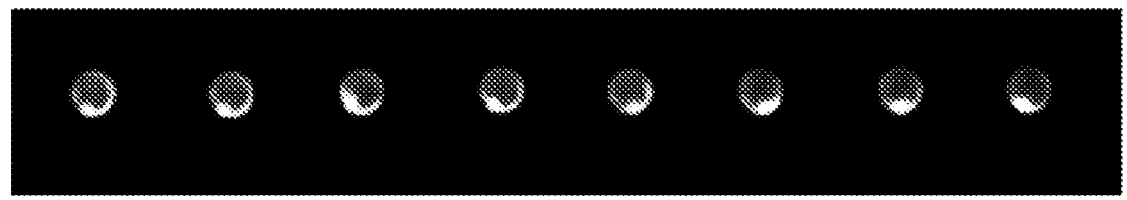
Figure 7B:
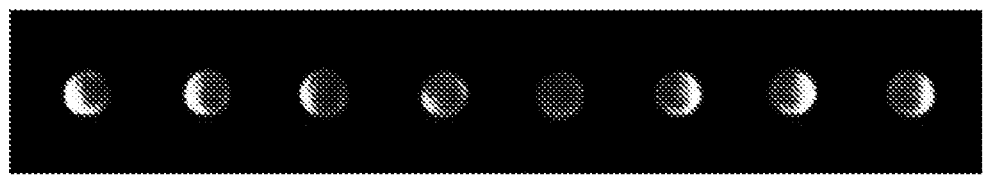
FIGS. 7B, 7C, and 7D depict time-dependent rotation of epifluorescent images of Janus particles of the colloidosome of FIG. 7A after modification with a rhodamine B isothiocyanate group.
Figure 7C:
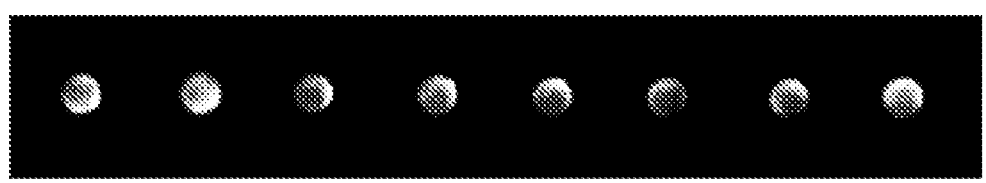
Figure 7D:
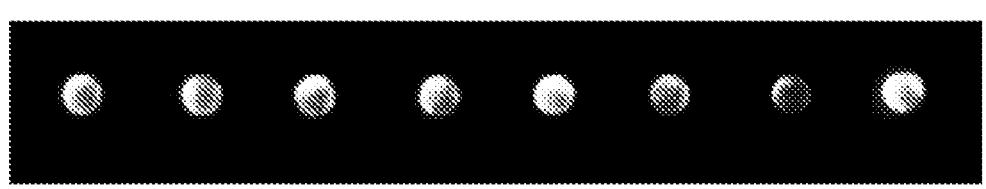

The solid colloidosomes were chemically modified with APS and subsequently with rhodamine B isothiocyanate to produce fluorescent-labeled APS on one surface of the particles. The resultant Janus particles were recovered free of paraffin wax as described in Example 1. Time-dependent epifluorescence imaging was performed on the resultant Janus particles as described in Example 2. FIGS. 6B and 6C depict Janus particles released from colloidosomes having a Janus angle of 35 degrees and 36 degrees, respectively. FIGS. 7B, 7C, and 7D depict Janus particles released from colloidosomes having a Janus angle of 60 degrees, 59 degrees and 71 degrees, respectively.

Example 4

Fabrication of a Janus Protein Microparticle With a Gold Coating on One Surface (Prophetic Example)

BSA interacts very strongly with gold nanoparticles via its amine and thiol residues. Because of the presence of thiol and amine groups, the microparticle can be used as a template for the adhesion of gold nanoparticles. The gold colloid can adsorb directly onto the protein shell via interaction with thiol and amine groups. Thus, a Janus protein microparticle will be prepared having a gold coating on one side of the particle.

Air-filled microparticles 0.5 to 5 μm in diameter with a 50 Å thick protein shell will be initially prepared. The microparticles will be produced by sonicating a 5% weight per volume solution of bovine serum albumin (BSA) in water. The high-intensity ultrasound necessary for the reaction will be generated by a titanium horn with tip diameter of 0.5 inches, driven at 20 kHz. The BSA solution will be sonicated for 3 min at an acoustic power of 76 W/cm$^2$. The microparticle sizes will be generally under 5 μm. This size distribution should enable them to pass readily through the microcirculation.

The obtained protein microparticles (0.2 g) will be mixed with paraffin wax (1 g) (pre-heated at 75° C.) and water (10 g) (pre-heated at 75° C.) to form a mixture. An emulsion will be prepared by magnetically stirring the mixture at 1600×rpm for 1 hour. The emulsion will be cooled to room temperature to form a suspension of colloidosomes containing solidified wax and BSA microparticles embedded on the surface of the wax. The colloidosomes will be collected and washed, followed by incubation in an aqueous solution containing reduced chloroauric acid. The mixture will be shaken gently for 25 min, followed by collection of the colloidosomes. The colloidosomes may take on a reddish color; which is indicative that the gold particles had been transferred to the exposed microparticle surface of the colloidosomes. These colloidosomes will be collected by centrifugation, washed with water, and suspended in chloroform to dissolve the paraffin wax component of the colloidosome and to release the Janus particles. The Janus particles will be purified and analyzed for the presence of a gold coating on one surface.

REFERENCES CITED

1. Behrend, C. J.; Anker, J. N.; McNaughton, B. H.; Kopelman, R. J. Magn. Magn. Mater. 2005, 293, 663.
2. Behrend, C. J.; Anker, J. N.; McNaughton, B. H.; Roberts, T. G.; Brasuel, M.; Philbert, M. A.; Kopelman, R. J. Phys. Chem. B 2004, 108, 10408.
3. Cayre, O.; Paunov, V. N.; Velev, 0. D. J. Mater. Chem. 2003, 13, 2445.
4. de Gennes, P. G. ReV. Mod. Phys. 1992, 64, 645.
5. Dendukuri, D.; Pregibon, D. C.; Collins, J.; Hattan, T. A.; Doyle, P. S. Nat. Mater. 2006, 5, 365.
6. Erhardt, R.; Boker, A.; Zetti, H.; Kaya, H.; Pyckhout-Hintzen, W.; Krausch, G.; Abetz, V.; Muller, A. H. E. Macromolecules 2001, 34, 1069.
7. Fujimoto, K.; Nakahama, K.; Shidara, M.; Kawaguchi, H. Langmuir 1999, 15, 4630.
8. Gu, H. W.; Yang, Z. M.; Gao, J. H.; Chang, C. K.; Xu, B. J. Am. Chem. Soc. 2005, 127, 34.
9. Hong, L.; Cacciuto, A.; Luijten, E.; Granick, S. Nano Lett., in press, 2006.
10. Lu, Y.; Xiong, H.; Jiang, X.; Xia, Y.; Prentiss, M.; Whitesides, G. M. J. Am. Chem. Soc. 2003, 125, 12724.
11. Nie, Z.; Li, W.; Seo, Minseok.; Xu, S.; Kumacheva, E. J. Am. Chem. Soc. 2006, 128, 9408.
12. Nisisako, T.; Torii, T.; Takahashi, T.; Takizawa, Y. AdV. Mater. 2006, 18, 1152.
13. Paunov, V. N.; Cayre, 0. J. AdV. Mater. 2004, 16, 788.
14. Perro, A.; Reculusa, S.; Ravaine, S.; Bourgeat-Lami, E.; Duguet, E. J. Mater. Chem. 2005, 15, 3745.
15. Qi, M. H.; Lidorikis, E.; Rakich P. T.; Johnson S. G.; Joannopoulos, J. D.; Ippen, E. P.; Smith, H. I. Nature (London) 2004, 429, 538.
16. Roh, K.; Martin, D. C.; Lahann, J. Nat. Mater. 2005, 4, 759.
17. Takahara, Y. K.; Ikeda, S.; Ishino, S.; Tachi, K.; Ikeue, K.; Sakata, T.; Hasegawa, T.; Mori, H.; Matsumura, M.; Ohtani, B. J. Am. Chem. Soc. 2005, 127, 6271.
18. Takei, H.; Shimizu, N. Langmuir 1997, 13, 1865.
19. McNaught, A. D.; Wilkinson, A. IUPAC, Compendium of Chemical Terminology: IUPAC Recommendations, 2$^{nd}$ ed., 1997. (Blackwell, Oxford).

What is claimed is:

1. A method of forming Janus particles, comprising:

forming an emulsion comprising initial particles, a first liquid, and a second liquid;

solidifying the first liquid to form solid droplets, each solid droplet of the first liquid comprising at least a portion of multiple initial particles on a surface of the solid droplet, wherein the initial particles on the surface each has an exposed particle side and a blocked particle side; and treating the exposed particle sides with a first surface modifying agent, to form the Janus particles.

2. The method of claim 1, wherein at least a portion of the initial particles is at the interface between the first and second liquids in the emulsion.

3. The method of claim 1, wherein the initial particles comprise from $1\times10^{-4}$ to $1.5\times10^{-1}$ of the total mass fraction of the emulsion; the first liquid comprises from $5\times10^{-2}$ to 0.50 of the total mass fraction of the emulsion; and the second liquid comprises from 0.42 to 0.95 of the total mass fraction of the emulsion.

4. The method of claim 1, wherein the solidifying comprises lowering the temperature of the first liquid.

5. The method of claim 1, wherein the solidifying comprises polymerizing the first liquid.

6. The method of claim 1, further comprising removing the second liquid after solidifying the first liquid.

7. The method of claim 6, further comprising isolating the solid.

8. The method of claim 6, wherein the treating comprises contacting the exposed particle sides with a solution comprising the first surface modifying agent.

9. The method of claim 6, wherein the treating comprises exposing the exposed particle sides to electromagnetic radiation.

10. The method of claim 1, further comprising forming the initial particles by modifying precursor particles.

11. The method of claim 10, wherein the initial particles comprise microparticles or nanoparticles; the first liquid comprises paraffin wax; and the second liquid comprises water.

12. A method of forming Janus particles, comprising:

forming an emulsion comprising initial particles, a first liquid, a second liquid, and a surfactant;

solidifying the first liquid to form solid droplets, each solid droplet of the first liquid comprising at least a portion of multiple initial particles on a surface of the solid droplet, wherein the initial particles on the surface each has an exposed particle side and a blocked particle side; and treating the exposed particle sides with a first surface modifying agent, to form the Janus particles.

13. The method of claim 12, wherein the Janus particles have a Janus balance of 10 percent to 50 percent.

14. The method of claim 12, wherein the initial particles comprise microparticles or nanoparticles; the first liquid comprises paraffin wax; and the second liquid comprises water.

* * * * *